3,358,042
PROCESS FOR RECOVERING POLYTETRA-METHYLENE ETHER GLYCOL

Andrew P. Dunlop, Riverside, and Edward Sherman, Chicago, Ill., assignors to The Quaker Oats Company, Chicago, Ill., a corporation of New Jersey
No Drawing. Filed Sept. 20, 1963, Ser. No. 310,449
7 Claims. (Cl. 260—615)

This invention relates to a process for recovering polytetramethylene ether glycol, hereinafter referred to as PTMEG, from an aqueous acidic solution. The manufacture of PTMEG usually results in a highly acidic mixture of PTMEG and water. In a preferred method of manufacture of PTMEG, tetrahydrofuran, hereinafter referred to as THF, is catalytically polymerized by fluosulfonic catalytic acid, and the catalytic activity is terminated by the addition of water. This results in a mixture of PTMEG and water which contains hydrofluoric and sulfuric acids. The PTMEG product must be essentially anhydrous and neutral and should have good color if the product is to find use in many urethane applications.

In order to obtain a purified PTMEG it has been proposed that the crude PTMEG be subjected to multistage countercurrent extraction with water. This is inherently cumbersome and requires comparatively large volumes of process liquors and comparatively large PTMEG holdup in this system. The proposed water-wash methods have not resolved the problem resulting from the fact that as the PTMEG becomes more nearly neutral it tends to emulsify in the water phase from which it separates very slowly. This problem is particularly acute in the manufacture of lower molecular weight PTMEG. Proposed multistage countercurrent water extraction procedures are particularly unsuitable in the manufacture of small batches of PTMEG. Because of the specific requirements of PTMEG users, it is desirable that a variety of different molecular weight products be produced economically. Hence, it would be advantageous to purify and recover substantially neutral and anhydrous PTMEG from small, customer-tailored production batches. Furthermore, water wash of PTMEG leads to a substantial loss of low molecular weight polymer to the water-wash phase with corresponding decrease in yield.

An object of this invention is to provide an efficient process for recovery and purification of PTMEG which requires a small in-stream holdup of PTMEG.

Another object of this invention is to provide a process for recovery of PTMEG which does not develop undesirable color.

A further object of this invention is to provide a process which provides substantially acid-free PTMEG.

Another object of this invention is to provide a process by which PTMEG losses associated with water-extraction processes are substantially reduced.

An additional object is to provide a process for the recovery of PTMEG which requires a minimum of process time.

A further object of this invention is to provide a process whereby relatively small batches of PTMEG can be recovered and purified economically and efficiently.

In accordance with this invention it has been found that these and other objects which will be apparent hereinafter are all accomplished by a process for recovering PTMEG polymer from a catalytically active THF-polymer-catalyst mixture comprising the following steps: (1) substantially terminating the catalytic activity of said mixture by admixing water therewith, (2) removing THF from the mixture resulting from step 1, (3) admixing a water-immiscible polymer solvent with the THF-free mixture resulting from step 2, thereby forming a polymer solution, (4) admixing with said polymer solution a neutralizer selected from the group consisting of carbonates, bicarbonates, hydroxides and oxides of alkaline earth metals, ammonia, carbonates and bicarbonates of alkali metals, and mixtures thereof, (5) removing uncombined water from the mixture resulting from step 4, and (6) substantially removing suspended solids from the mixture resulting from step 5, sufficient water being added during the process prior to step 5 to provide uncombined water in the admixture resulting from step 4.

It has been found that the catalytic activity must be substantially terminated prior to the addition of the neutralizer. Ammonia can react with an active THF-polymer-catalyst mixture to form stable polyether amines rather than glycols. If the other neutralizers are added to the active THF-catalyst-polymer mixture with the water, a stable polymer-water emulsion appears to form, and later a stable polymer-water-solvent mixture develops when the solvent is admixed. We have, as yet, been unable to recover PTMEG from this marshmallow-like stable mixture. The reaction between water and the active THF-polymer-catalyst mixture is extremely rapid. It has also been found that unless uncombined water is present in the mixture resulting from step 4, the final product remains acidic even though a large excess of neutralizer is used in the process. Unless THF is substantially removed at the step indicated, subsequent recovery of the THF becomes more difficult.

The water-immiscible polymer solvent used in the process is any unreactive solvent which is substantially immiscible with water and which dissolves PTMEG. We have found that suitable solvents are unreactive inert solvents which boil below 150° C. at atmospheric pressure, which are less than 10% soluble by weight in water based on the weight of the water, and which dissolve one gram or more of 1000 M.W. PTMEG polymer per 9 ml. of solvent. The terms "unreactive" and "inert" are used to signify that the solvent does not undergo a substantial reaction or change under the conditions of the process. Illustration of suitable solvents, for example, are ethers, such as diethyl ether, and tetrahydropyran; ketones such as methyl isobutyl ketone; esters such as n-butyl acetate; alcohols such as amyl alcohol; hydrocarbons such as toluene, xylene and benzene; nitro compounds such as 1-nitropropane; halogenated compounds such as trichloroethylene and carbon tetrachloride.

Preferred solvents include hydrocarbons, ethers, and suitable halogenated compounds. Toluene is a particularly preferred solvent. Solvents which are ketones, esters, alcohols and nitro compounds are less desirable. Alcohols must be absent in most PTMEG final products, or the usefulness of the product in many polymer manufacturing processes is impaired.

It is preferred that the water added to terminate the catalytic activity be in sufficient excess so as to permit a water phase to separate after the water-immiscible polymer solvent is admixed with the crude reaction product. In a preferred method of producing PTMEG, the polymer is steamed for approximately one hour after catalytic activity is terminated. This steaming usually results in sufficient excess water to provide a water phase when the water-immiscible solvent is added. The water phase separates rapidly in the process of this invention. Separation of phases is usually completed in a few minutes. The highly acidic water phase is then preferably separated from the polymer solution, e.g., by decantation.

The neutralizer, preferably calcium hydroxide, carbonate, or mixtures of calcium hydroxide and carbonate, is then added in a quantity which is in stoichiometric excess of the acid remaining in the polymer. The amount of acidity is readily determined by any conventional method. A 10% excess of the neutralizing agent has been found to be ample. As indicated above, it has been found that neutralization of PTMEG is not complete unless uncombined water is present with the neutralizer. In a preferred embodiment, in which a water phase is separated from a solvent-polymer solution by decantation, sufficient water remains dissolved in the solvent-polymer solution to provide uncombined water after the addition and reaction of the neutralizer, and thereby to effect complete neutralization. The neutralized mixture then includes excess neutralizing agent, and neutralization products in addition to the solvent-polymer solution, and yet substantially all these inorganic materials must be substantially removed from PTMEG. This is also accomplished with ease in accordance with this invention. It has been found that the inorganic materials are removed with great difficulty if water is present. Hence, in the process of this invention uncombined water is substantially removed from the neutralized mixture, e.g., by azeotropic distillation. The inorganic materials are then readily removed by mechanical methods, such as, for example, filtration. It was found that filtration of a certain neutralized mixture which contained a small amount of dissolved uncombined water required many hours, while filtrations of identical mixtures from which uncombined water was substantially removed in accordance with this invention took less than ten minutes to be completed. Moreover, product obtained when dehydration was carried out after filtration, rather than before, usually contained a visually perceptible amount of suspended solids. It is emphasized that separation of an aqueous phase after the admixing of the neutralizer is not sufficient to substantially remove the uncombined water. A preferred method for substantially removing the uncombined water from the neutralized mixture is conventional azeotropic distillation. One alternative method of substantially removing uncombined water is contacting the mixture with solid desiccants. Activated charcoal or other absorbents may be added prior to the azeotropic distillation, if desired. The substantially dry PTMEG solution containing the above inorganic materials can be filtered by any conventional means.

The resulting solution of PTMEG is neutral and substantially ash free. The PTMEG can be used in this solution or the solvent can be removed by distillation to give a dry, neutral PTMEG polymer.

Hence, a preferred embodiment of this invention is a process for recovering PTMEG from a catalytically active THF-polymer-catalyst mixture comprising the following steps: (1) admixing water with said mixture, (2) steam-distilling the mixture resulting from step 1 until the mixture reaches a temperature of about 95° C., (3) admixing a water-immiscible polymer solvent with the mixture resulting from step 2, (4) allowing an aqueous phase to separate from a solvent-polymer phase and removing the aqueous phase from contact with the solvent-polymer phase, (5) admixing with the separated solvent-polymer phase said neutralizer, preferably calcium hydroxide, calcium carbonate, or mixtures thereof, (6) removing uncombined water from the mixture resulting from step 5, and (7) removing suspended solids from the mixture resulting from step 6, sufficient water being added prior to step 6 to provide uncombined water in the admixture resulting from step 5.

In broader concept, this invention is a process for recovering PTMEG from a mixture comprising water, PTMEG, and acid, comprising the following steps: (1) admixing a water-immiscible polymer solvent and the mixture to form a polymer solution, (2) admixing with said solution a neutralizer selected from the group consisting of carbonates, bicarbonates, hydroxides and oxides of alkaline earth metals, ammonia, carbonates and bicarbonates of alkali metals and mixtures thereof, (3) removing uncombined water from the mixture resulting from step 2, and (4) substantially removing suspended solids from the mixture resulting from step 3, sufficient water being added prior to step 3 to provide uncombined water in the mixture resulting from step 2.

The invention is further illustrated but is not limited by the following examples. Unless otherwise indicated all parts stated are in parts by weight. The term "Nil" after an analysis indicates that that material, if present, is less than the lowest significant amount detectable by standard methods of analysis.

*Example 1*

Two polymerization runs were carried out in an identical manner, except that the PTMEG produced in the first run was recovered and purified by a conventional water-wash procedure, and the PTMEG produced in the second run was recovered and purified in accordance with this invention. In each run 505 parts of dry, freshly distilled THF was polymerized at 35° C. in the presence of 89.4 parts of fluosulfonic acid for a period of four hours. Four hours after the addition of the catalyst, 1500 parts of room-temperature water was dumped into the reaction mixture to terminate the catalytic activity. In both runs, the entire mass, including the added water, was then heated to remove the unreacted THF, which was recovered and measured. Live steam was then introduced into each mixture for one hour. The first run was then permitted to cool and the aqueous phase separated from the polymer. The steaming was then repeated for one hour. The polymer was somewhat viscous, and much agitation was required along with the steaming to provide mixing of the water and the polymer. A total of four water-extraction steps or washes consisting of one-hour steaming followed by a separation of the aqueous phase were employed. The separation of phases became slower after each successive wash. The second, third and fourth separations were extremely slow since the polymer tended to emulsify. More than a day was required for the final separation. After the final separation of the water phase, the separated polymer phase was dried by heating to 100° C. for one hour at 0.2 mm. Hg. The PTMEG remaining was then weighed.

The product of the second run was purified and recovered in accordance with this invention. After the one hour of steaming, the water product including added water was cooled to below 84° C., 866 parts of toluene was added thereto and vigorously stirred therewith for about five minutes. After stirring ceased, two phases separated immediately and the lower water layer was separated. The amount of acidity in the toluene layer was determined and solid calcium hydroxide was added to the toluene layer in sufficient quantity to neutralize the acidity and to provide a 10% excess of calcium hydroxide. The slurry was stirred for about 15 minutes and then subjected to azeotropic distillation to remove water. The substantially dry toluene-polymer solution was then filtered to remove solids. The filtration was rapid and required about five minutes of actual filtering time. Volatiles were removed from the filtrate under reduced pressure.

The time required for the purification and recovery of the first run was about three days. The lapsed time for recovery of the product of the second run, performed in accordance with this invention, was less than six hours.

The result of these polymerization runs is summarized in Table I. The term "Percent Yield" refers to the weight percent of the THF charge which appeared as recovered polymer and was determined as follows:

$$\frac{\text{Wgt. PTMEG recovered}}{\text{Wgt. THF fed}} \times 100 = \text{percent yield}$$

The term "Recovered THF" refers to the weight percent of the THF charge which was recovered as unreacted THF. The term "Percent THF Loss" represents the weight percent of the feed which was not recovered as monomer or polymer. The acid number is the number of milligrams of potassium hydroxide required to neutralize a one-gram sample. The "Molecular Weight" refers to number average value, and was based on the hydroxyl number and the assumption that there are two hydroxyl groups per molecule. The term "Difference" represents the difference between the value obtained in Run 1 and Run 2, expressed as percent of the value of Run 1.

TABLE I

|  | Run 1 Water Wash | Run 2 This Invention | Difference |
|---|---|---|---|
| Molecular Weight | 920 | 644 | |
| Percent Yield | 44.8 | 59.5 | +32.8 |
| Recovered THF, Percent | 34.5 | 34.0 | −1.5 |
| Percent THF Loss | 20.7 | 6.5 | −68.7 |
| Acid Number | 0.3 | 0.0 | |

*Example 2*

Four identical polymerization runs were made in which 89.5 parts of fluosulfonic acid were added to 505 parts of THF. A four-hour polymerization time was employed in each run. The catalytic activity of each run was terminated by sudden addition of 750 ml. of ice water to the active THF-polymer-catalyst mixture. Each crude product-water mixture was then subjected to steam distillation for one hour after first appearance of distillate. THF was recovered from the distillate by fractional distillation. Each run was then cooled to 80° C., and one liter of toluene was added and stirred for five minutes. The aqueous phase was then drawn off and the number of equivalents of acidity in the aqueous phase determined. This number was then subtracted from the number of equivalents of fluosulfonic acid catalyst used to estimate the number of equivalents remaining in the separated wet toluene-PTMEG solution. Up to this point the treatment given to each of these runs was identical within experimental error. A different neutralizer was added to each run, i.e. calcium hydroxide (Run 1), sodium carbonate (Run 2), ammonium hydroxide (Run 3), and sodium hydroxide (Run 4). Hence Runs 1, 2 and 3 were in accordance with this invention, while Run 4 was not in accordance with this invention. The neutralizer was added in an amount to provide equivalents of 110% of the number of equivalents of acid in the separated wet toluene-PTMEG solution. Each run was then heated to remove water by azeotropic distillation, the toluene being returned to the still. When water no longer came over in the azeotropic distillation, the still residue was considered to be substantially dry, and each residue was then filtered to remove the solids. Toluene was then removed from the filtrate under reduced pressure. The residue was weighed and analyzed, and molecular weight was calculated on the basis of the hydroxyl number. The results are summarized in Table II, in which Percent Yield, Recovered THF, Acid Number, THF Loss, and Molecular Weight have the meaning defined in Example 1.

TABLE II

| Run | 1 | 2 | 3 | 4 |
|---|---|---|---|---|
| Neutralizer | Ca(OH)$_2$ | Na$_2$CO$_3$ | NH$_4$OH | NaOH |
| Percent Yield | 71.0 | 69.2 | 71.0 | 66.2 |
| Recovered THF, Percent | 24.6 | 24.7 | 24.6 | 24.8 |
| Percent THF Loss | 4.4 | 6.1 | 4.4 | 9.0 |
| Acid Number | 0 | 0 | 0 | 0 |
| Percent Ash | Nil | Nil | | 0.05 |
| Percent Nitrogen | | | <.001 | |
| Molecular Weight | 821 | 808 | 816 | 840 |
| Color | APHA 25–50 | APHA 75 | APHA 75 | Gardner 4–5 |

It is apparent from Table II that the products of the processes of this invention, namely Runs 1, 2 and 3, were neutral and of excellent color and purity. Though Run 4 was identical within experimental error to Runs 1, 2 and 3, except that the neutralizer was not in accord with this invention, the polymer was of unsatisfactory color and purity and was obtained in substantially less yield and with substantially more loss.

Hence, it is clear from the disclosure and the numbered examples that this invention provides an economical and efficient process for recovery of PTMEG, even from small batches, in which a pure, neutral product of excellent color is obtained in a comparatively short time.

We claim:
1. The process for recovering polytetramethylene ether glycol polymer from a catalytically active tetrahydrofuran-polymer-fluosulfonic acid mixture consisting essentially of the following steps: (1) substantially terminating the catalytic activity of said mixture by admixing water therewith; (2) removing tetrahydrofuran from the mixture resulting from step 1 by steam distilling or by heating the whole mass; (3) admixing a water-immiscible polymer solvent with the tetrahydrofuran-free mixture resulting from step 2, thereby forming a polymer solution, said solvent being selected from unreactive inert solvents which boil below 150° C. at atmospheric pressure, which are less than 10% soluble by weight in water based on the weight of water, and which dissolve one gram or more of 1000 M.W. polytetramethylene ether glycol polymer per 9 ml. of solvent; (4) admixing with said polymer solution a neutralizer selected from the group consisting of carbonates, bicarbonates, hydroxides and oxides of alkaline earth metals, ammonia, carbonates and oxides of alkali metals, and mixtures thereof, said neutralizer being admixed in a quantity which is in stoichiometric excess of the acid remaining in the polymer; (5) removing uncombined water from the mixture resulting from step 4 by azeotropic distillation, or by contact with solid desiccants, sufficient water being added during the process prior to step 5 to provide uncombined water in the admixture resulting from step 4; (6) substantially removing suspended solids by a mechanical method from the mixture resulting from step 5; and finally, (7) distilling the solvent from the mixture resulting from step 6 under reduced pressure.

2. A process for preparing a substantially dry, neutral and ash-free polytetramethylene ether glycol polymer solution from a catalytically active tetrahydrofuran-polymer-fluosulfonic acid mixture consisting essentially of the following steps: (1) admixing water with said mixture; (2) steam-distilling the mixture resulting from step 1 until the mixture reaches a temperature of about 95° C.; (3) admixing a water-immiscible polymer solvent with the mixture resulting from step 2, said solvent being selected from unreactive inert solvents which boil below 150° C. at atmospheric pressure, which are less than 10% soluble by weight in water based on the weight of water, and which dissolve one gram or more of 1000 M.W. polytetramethylene ether glycol polymer per 9 ml. of solvent, the amount of water being in sufficient excess so as to permit a water phase to separate after the water-immiscible polymer-solvent is admixed in step 3; (4) allowing an aqueous phase to separate from a solvent-polymer phase and removing the aqueous phase from contact with the solvent-polymer phase; (5) admixing with the separated solvent polymer phase a neutralizer selected from the group consisting of carbonates, bicarbonates, hydroxides and oxides of alkaline earth metals, ammonia, carbonates and bicarbonates of alkali metals, and mixtures thereof, said neutralizer being admixed in a quantity which is in stoichiometric excess of the acid remaining in the polymer; (6) removing uncombined water from the mixture resulting from step 5 by azeotropic distillation, or by contact with solid desiccants, sufficient water being added prior to step 6 to provide uncombined water in the admixture resulting from step 5; and (7) removing suspended solids by a mechanical method from the mixture resulting from step 6, thereby producing a substantially dry, neutral and ash-free solution of polytetramethylene ether glycol.

3. A process for recovering polytetramethylene ether glycol polymer from a mixture comprising water, polytetramethylene ether glycol, and acid, consisting essentially of the following steps: (1) admixing a water-immiscible polymer solvent and the mixture to form a polymer solution, said solvent being selected from unreactive inert solvents which boil below 150° C. at atmospheric pressure which are less than 10% soluble by weight in water based on the weight of water, and which dissolve one gram or more of 1000 M.W. polytetramethylene ether glycol polymer per 9 ml. of solvent, (2) admixing with said solution a neutralizer selected from the group consisting of carbonates, bicarbonates, hydroxides, and oxides of alkaline earth metals, ammonia, carbonates and bicarbonates of alkali metals, and mixtures thereof, said neutralizer being admixed in a quantity which is in stoichiometric excess of the acid remaining in the polymer, (3) removing uncombined water from the mixture resulting from step 2 by azeotropic distillation, or by contact with solid desiccants, sufficient water being added prior to step 3 to provide uncombined water in the admixture resulting from step 2; (4) substantially removing suspended solids by a mechanical method from the mixture resulting from step 3; and finally, (5) distilling the solvent from the mixture resulting from step 4 under reduced pressure.

4. A process as in claim 3 wherein said polymer solvent is toluene.

5. The process for recovering polytetramethylene ether glycol polymer from a catalytically active tetrahydrofuran-polymer-fluosulfonic acid mixture consisting essentially of the following steps: (1) substantially terminating the catalytic activity of said mixture by admixing water therewith; (2) removing tetrahydrofuran from the mixture resulting from step 1 by steam distilling or heating the whole mass; (3) admixing a water-immiscible polymer solvent with the tetrahydrofuran-free mixture resulting from step 2, thereby forming a polymer solution, said solvent being selected from unreactive inert solvents which boil below 150° C. at atmospheric pressure, which are less than 10% soluble by weight in water based on the weight of the water, and which dissolve one gram or more of 1000 M.W. polytetramethylene ether glycol per 9 ml. of solvent; (4) admixing with said polymer solution a neutralizer selected from the group consisting of carbonates, bicarbonates, hydroxides and oxides of alkaline earth metals, ammonia, carbonates and bicarbonates of alkali metals, and mixtures thereof, said neutralizer being admixed in a quantity which is in stoichiometric excess of the acid remaining in the polymer; (5) removing uncombined water from the mixture resulting from step 4 by azeotropic distillation, or by contact with solid desiccants, sufficient water being added prior to step 5 to provide uncombined water in the admixture resulting from step 4; (6) substantially removing suspended solids by a mechanical method from the mixture resulting from step 5, and finally, (7) distilling the solvent from the mixture resulting from step 6 under reduced pressure.

6. The process as in claim 5 wherein said polymer solvent is toluene.

7. Process for recovering pure, dry neutral polytetramethylene ether glycol from a starting solution of polytetramethylene ether glycol, sulfuric acid, hydrofluoric acid and water consisting essentially of the following steps:

(1) admixing a water-immiscible polymer solvent with the starting solution to form a solvent-polymer phase and an aqueous phase, the amount of water present in said starting solution being sufficient to permit a water phase to separate after the water-immiscible solvent-polymer is admixed in step 1, said solvent being selected from unreactive inert solvents which boil below 150° C. at atmospheric pressure, which are less than 10% soluble by weight in water based on the weight of water, and which dissolve one gram or more of 1000 M.W. polytetramethylene ether glycol polymer per 9 ml. of solvent;

(2) allowing an aqueous phase to separate from the solvent-polymer phase and removing the aqueous phase from contact with the solvent-polymer phase;

(3) admixing with the separated solvent-polymer phase a neutralizer selected from the group consisting of carbonates, bicarbonates, hydroxides and oxides of alkaline earth metals, ammonia, carbonates and bicarbonates of alkali metals and mixtures thereof, said neutralizer being admixed in a quantity which is in stoichiometric excess of the acid remaining in the solvent-polymer phase;

(4) distilling uncombined water from the mixture resulting from step 3, sufficient water being present at the end of step 3 to provide uncombined water in the mixture treated in step 4;

(5) filtering suspended solids from the mixture resulting from step 4; and finally, (6) distilling the solvent from the mixture resulting from step 5 under reduced pressure.

References Cited

UNITED STATES PATENTS

| | | |
|---|---|---|
| 2,691,038 | 10/1954 | Engelhardt. |
| 2,751,419 | 6/1956 | Hill et al. _____ 260—615 |
| 2,927,098 | 3/1960 | Goldberg. |

LEON ZITVER, *Primary Examiner.*

H. MARS, *Assistant Examiner.*